(12) United States Patent
Yamazaki et al.

(10) Patent No.: US 7,246,813 B2
(45) Date of Patent: Jul. 24, 2007

(54) BABY CARRIAGE FOLDING MECHANISM FOR A FOLDING BABY CARRIAGE

(75) Inventors: Kojiro Yamazaki, Urawa (JP); Yuichi Arai, Urawa (JP); Mikiya Tanaka, Urawa (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 11/317,147

(22) Filed: Dec. 27, 2005

(65) Prior Publication Data

US 2006/0097486 A1     May 11, 2006

Related U.S. Application Data

(62) Division of application No. 10/826,399, filed on Apr. 19, 2004, now Pat. No. 7,007,968, which is a division of application No. 10/146,116, filed on May 16, 2002, now Pat. No. 6,752,413, which is a division of application No. 09/569,052, filed on May 10, 2000, now Pat. No. 6,422,587.

(30) Foreign Application Priority Data

Oct. 12, 1999    (JP)   ............................. 1999-289330

(51) Int. Cl.
*B62B 7/06*     (2006.01)
(52) U.S. Cl. ....................... 280/650; 280/646
(58) Field of Classification Search ............... 280/646, 280/647, 650, 642
See application file for complete search history.

(56) References Cited

U.S. PATENT DOCUMENTS

| | | | |
|---|---|---|---|
| 4,191,397 A | 3/1980 | Kassai | |
| 4,272,100 A | 6/1981 | Kassai | |
| 4,335,893 A | 6/1982 | Carmichael et al. | |
| 4,506,907 A | 3/1985 | Miyagi | |
| 4,545,599 A | 10/1985 | Kassai | |
| 4,614,454 A | 9/1986 | Kassai | |
| 4,619,542 A | 10/1986 | Kassai | |
| 5,205,579 A | 4/1993 | Kato et al. | |
| 5,511,441 A | 4/1996 | Arai | |
| 5,535,483 A | 7/1996 | Jane Cabagnero | |
| 5,669,623 A | 9/1997 | Onishi | |
| 5,752,738 A | 5/1998 | Onishi et al. | |
| 5,810,382 A | 9/1998 | Onishi | |
| 5,819,892 A | 10/1998 | Deliman et al. | |
| 6,068,284 A | 5/2000 | Kakuda | |

(Continued)

FOREIGN PATENT DOCUMENTS

| | | |
|---|---|---|
| EP | 0 732 251 | 9/1996 |
| EP | 1170193 A1 | 9/2002 |
| JP | 1-297372 | 11/1989 |

*Primary Examiner*—Jeff Restifo
(74) *Attorney, Agent, or Firm*—Wenderoth, Lind & Ponack, L.L.P.

(57) ABSTRACT

A casing (32) included in a baby carriage folding mechanism is mounted on a substantially middle part of the handle of a folding baby carriage. Hinged joints (33) each having a stationary member (34) and a movable member (35) are connected to the opposite ends of the casing (32), and pipes (18) forming the handle are connected to the hinged joints (33), respectively. The pipes (18) are connected to the movable members (35) of the joints (33). Actuating members (38a and 38b) capable of being operated by an operating mechanism included in the casing (32) are connected to the movable members (35) of the hinged joints (33). The actuating members (38a and 38b) turn the movable members (35) relative to the corresponding stationary members (34) for folding and developing the folding baby carriage.

1 Claim, 10 Drawing Sheets

U.S. PATENT DOCUMENTS

| | | |
|---|---|---|
| 6,129,373 A | 10/2000 | Cheng |
| 6,339,862 B1 | 1/2002 | Cheng |
| 6,422,587 B1 | 7/2002 | Yamazaki et al. |
| 6,443,479 B2 | 9/2002 | Huang |
| 6,485,216 B1 | 11/2002 | Cheng |
| 6,824,161 B2 | 11/2004 | Iwata |
| 6,851,700 B2 | 2/2005 | Yoshie et al. |
| 6,860,504 B2 * | 3/2005 | Suga et al. ................ 280/642 |
| 6,877,760 B2 | 4/2005 | Wang |
| 6,893,031 B2 * | 5/2005 | Suzuki ................... 280/47.36 |
| 7,007,968 B2 * | 3/2006 | Yamazaki et al. .......... 280/647 |
| 7,021,650 B2 * | 4/2006 | Chen .......................... 280/642 |
| 7,114,743 B2 * | 10/2006 | Kassai et al. ............... 280/650 |
| 2004/0245748 A1 | 12/2004 | Wang |
| 2005/0029775 A1 | 2/2005 | Chen |
| 2005/0121882 A1 * | 6/2005 | Suga et al. ................ 280/642 |

* cited by examiner

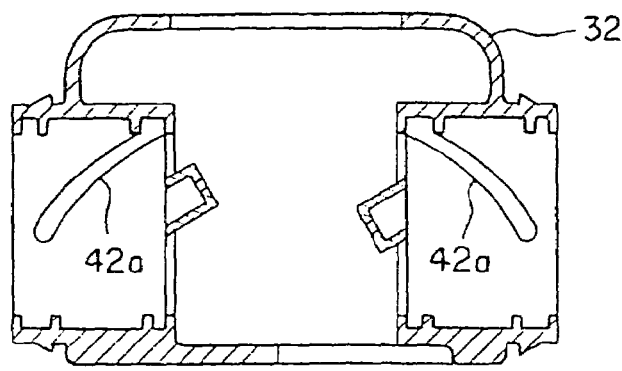
F I G. 3 (a)
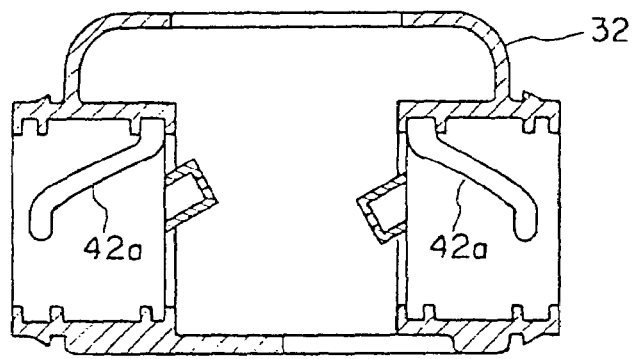
F I G. 3 (b)
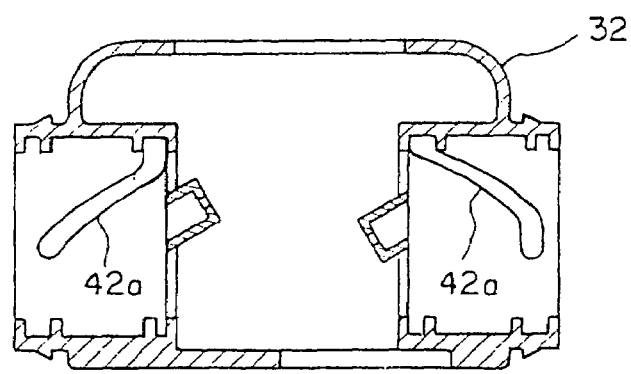
F I G. 3 (c)
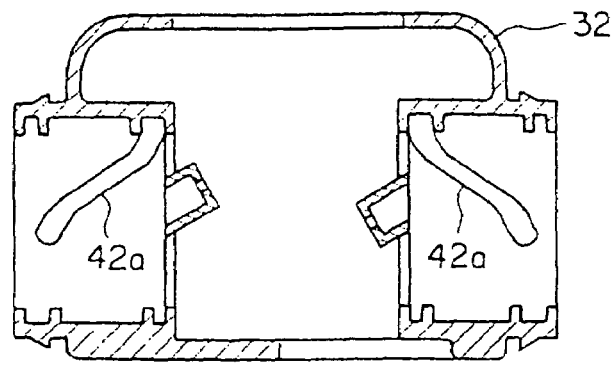
F I G. 3 (d)

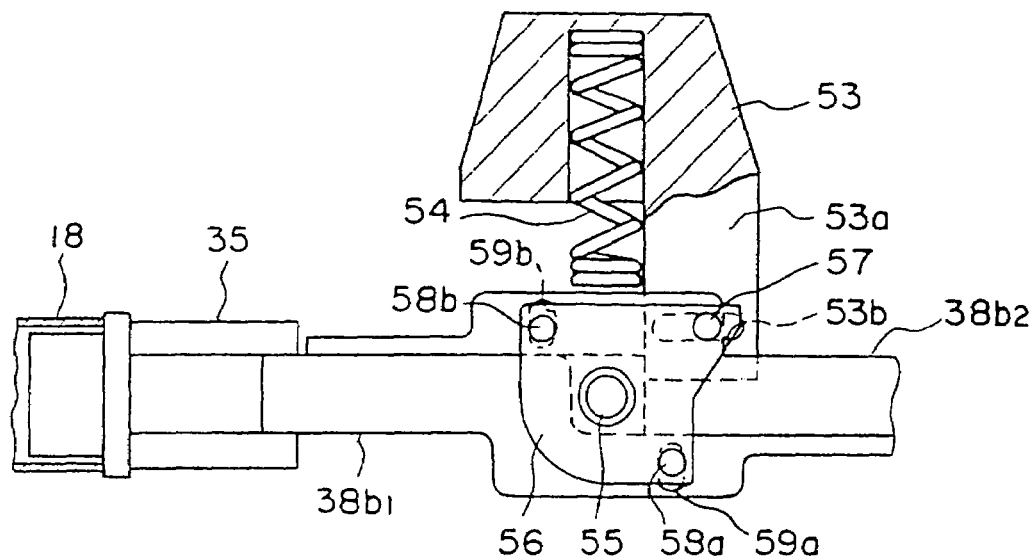
F I G. 5(a)
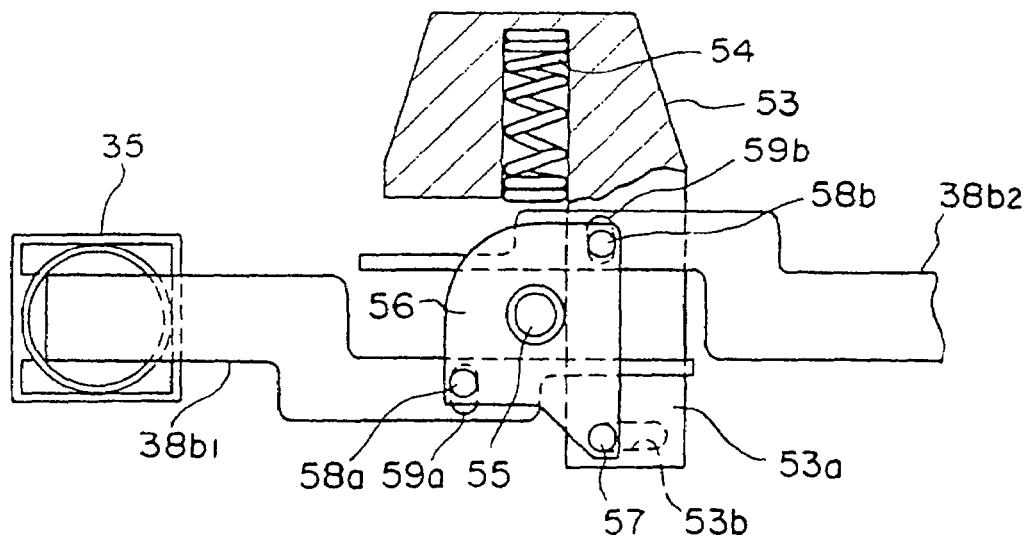
F I G. 5(b)

BABY CARRIAGE FOLDING MECHANISM FOR A FOLDING BABY CARRIAGE

This application is a divisional of U.S. application Ser. No. 10/826,399, filed Apr. 19, 2004 now U.S. Pat. No. 7,007,968, which is a divisional of U.S. application Ser. No. 10/146,116, filed May 16, 2002, now U.S. Pat. No. 6,752,413 which is a divisional of U.S. application Ser. No. 09/569,052, filed May 10, 2000, now U.S. Pat. No. 6,422,587.

BACKGROUND OF THE INVENTION

1. Field of the Invention

The present invention relates to a baby carriage folding mechanism for a baby carriage foldable in three and, more particularly, to a baby carriage folding mechanism mounted on the handle of a folding baby carriage.

2. Description of the Related Art

Various folding baby carriages for carrying a baby when taking the baby outdoors for walking or shopping have been proposed. When necessary, the folding baby carriages are folded for easy storage and carrying.

When folding the folding baby carriage in a compact package, the user holding the opposite ends of a handle or armrests needs to fold the baby carriage or the user holding a middle part of the handle needs to tilt the baby carriage so that one side of the baby carriage is folded onto the other side of the same by gravity, after folding a seat flat.

Accordingly, the user needs to change the position of the hands on the handle when folding the baby carriage by hand, and the user needs to use both hands for folding the baby carriage. Therefore, it is difficult for the user holding a baby in the user's arms to fold the baby carriage. When applying gravity to fold the baby carriage, the baby carriage needs an increased number of joints and the like to reduce resistance against the movement of parts when folding the baby carriage. Those joints reduce the rigidity of the body of the baby carriage and make it difficult to transmit the sensation of operations and locking of parts to the user.

SUMMARY OF THE INVENTION

According to a first embodiment of the present invention, a baby carriage folding mechanism for a baby carriage foldable in three includes a casing and right and left pipes connected to opposite ends of the casing by hinged joints, respectively. The pipes compose a handle for the baby carriage, wherein each of the hinged joints has an inner member on the side of the casing and an outer member capable of turning relative to the inner member on the side of the pipe. Actuating means for turning the outer members relative to the corresponding inner members are disposed between the casing and the outer members. The baby carriage can be folded or developed by turning the outer members relative to the corresponding inner members.

In the baby carriage folding mechanism according to the first embodiment of the present invention, the casing is provided on an inner surface thereof with guide grooves inclined to the longitudinal axis of the casing and substantially symmetrical with respect to the center of the casing. The actuating means comprises actuating members, each corresponding to the hinged joint, and sliding in the casing parallel to the longitudinal axis of the casing. Each of the actuating members has a forward end part pivotally joined to the outer member of the hinged joint at an eccentric position on the outer member, and a base end part provided with a projection in engagement with the guide groove of the casing. And each of the actuating members is moved forward and backward by turning the casing about its longitudinal axis to turn the outer member of the corresponding hinge.

In the baby carriage folding mechanism according to the first embodiment of the present invention, each of the guide grooves has curvilinear circumferentially extending portions formed at the starting and the terminating ends thereof.

In the baby carriage folding mechanism according to the first embodiment of the present invention, in an alternative arrangement the guide grooves are formed with inclinations that are different from each other.

In the baby carriage folding mechanism according to the present invention, in a further alternative arrangement each of the guide grooves has a section on which a large load is loaded, and the inclination of the section with respect to circumferential direction of the casing is small.

In the baby carriage folding mechanism according to another embodiment of the present invention, an operating member is placed on the casing for forward and backward movement. The operating member is provided with substantially symmetrical guide grooves inclined relative to a direction in which the operating member is moved. The actuating means comprises actuating members provided for axial sliding movement in the casing, each with actuating member corresponding to the corresponding hinged joint. Each of the actuating members has a forward end part pivotally joined to the outer member of the hinged joint at an eccentric position on the outer member, and a base end part provided with a projection in engagement with the guide groove of the operating member, so that the actuating members are moved forward and backward by moving the operating member forward and backward to turn the outer members of the hinged joints.

In the baby carriage folding mechanism according to another embodiment of the present invention, an operating member and a pulley to be turned by the operating member are provided on the casing. The actuating means comprises actuating members provided for axial sliding movement in the casing, with each actuating member corresponding to a hinged joint. Each of the actuating members has a forward end part joined pivotally to the outer member of the hinged joint at an eccentric position on the outer member, and a base end part. One of the base end part of the actuating member and the pulley is provided with a slot, and the other is provided with a projection that is engaged with the slot.

In the baby carriage folding mechanism according to another embodiment of the present invention, an operating member and a pulley to be turned by the operating member are provided on the casing. The actuating means comprises an actuating member provided for axial sliding movement in the casing, wherein the actuating member has opposite ends pivotally joined to the outer members of the hinged joints at eccentric positions on the outer members, respectively. One of a middle part of the actuating member and the pulley is provided with a slot, and the other is provided with a projection that is engaged with the slot.

In the baby carriage folding mechanism according to another embodiment of the present invention, the actuating means comprises actuating members provided for axial sliding movement in the casing, with each actuating member corresponding to the hinged joint. Each of the actuating members has a forward end part pivotally joined to the outer member of the hinged joint at an eccentric position on the outer member, and a base end part having a thread or a rack. And a helical gear is interposed between the base end parts of the actuating members are provided with the thread or a pinion.

In the baby carriage folding mechanism according to another embodiment of the present invention, the actuating means comprises actuating members provided for axial sliding movement in the casing, with each actuating member corresponding to the hinged joint. The actuating members are connected to eccentric parts of the outer members of the hinged joints through springs, respectively, and one end of a wire is connected to each actuating member while the other end of the wire is connected to a rear end of an armrest attached to each pipe forming the handle.

The baby carriage folding mechanism according to the present invention further comprises an unlocking mechanism placed in the casing, for unlocking locking members that lock the baby carriage in a developed state.

BRIEF DESCRIPTION OF THE DRAWINGS

FIGS. 3(a) to 3(d) are views showing modifications of grooves formed in a casing;

FIG. 5(a) is a schematic view of a baby carriage folding mechanism in a third embodiment according to the present invention in a state where an associated baby carriage is developed;

FIG. 5(b) is a schematic view of the baby carriage folding mechanism shown in FIG. 5(a) in a state where the associated baby carriage is folded;

DESCRIPTION OF THE PREFERRED EMBODIMENTS

Figure 11:
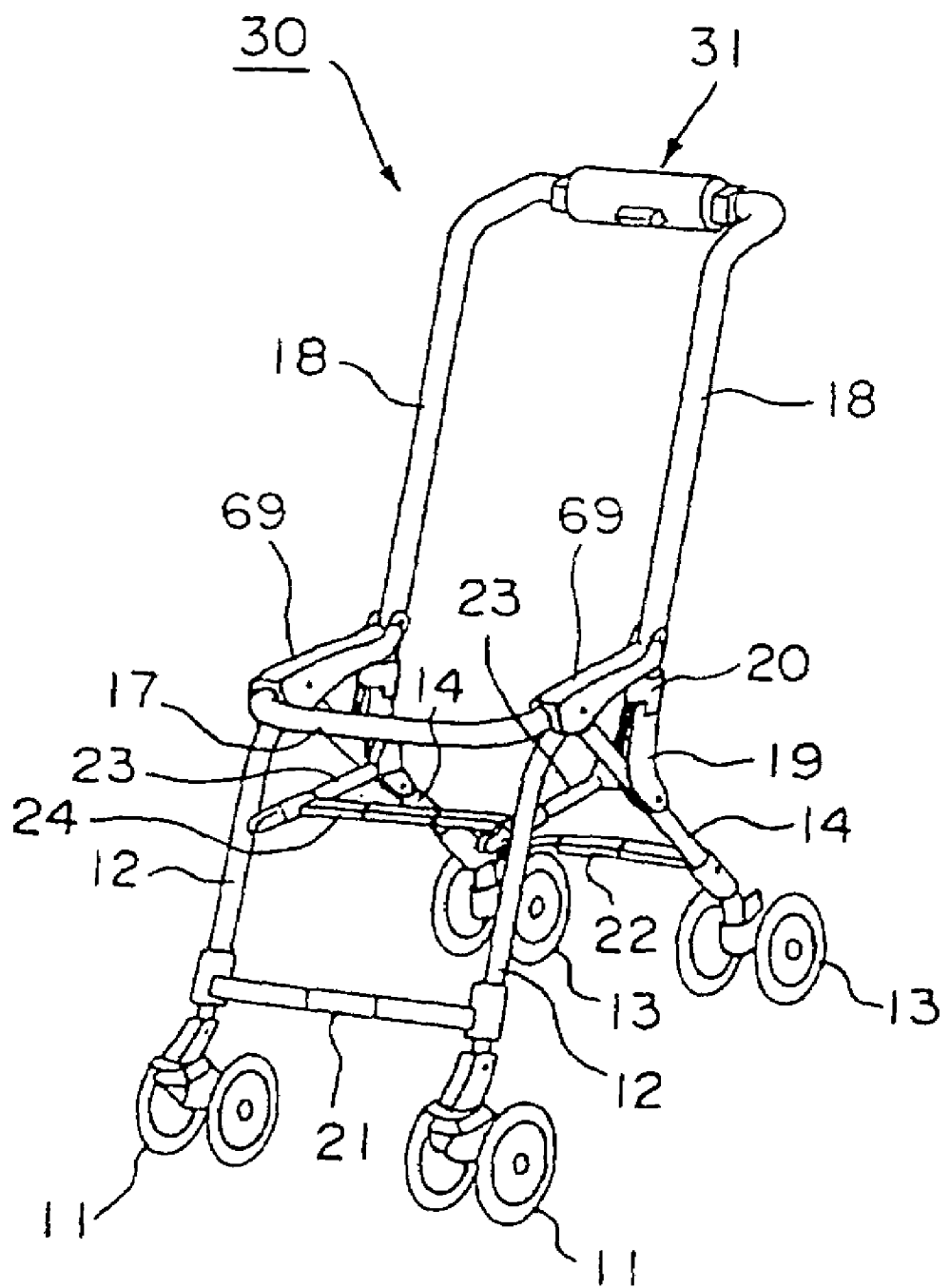
FIG. 11 is a perspective view of a baby carriage to which the present invention is applied.

A folding baby carriage will be described with reference to FIG. 11 showing the folding baby carriage in a perspective view. The baby carriage includes right and left front legs 12 each provided with a front wheel 11, right and left rear legs 14 each provided with a rear wheel 13, a substantially U-shaped handle 30, right and left armrests 69, and a guard arm 17 detachably connected to and extended between the armrests 69. Rear ends of the armrests 69 are pivotally joined to parts of pipes 18 of the handle 30 near the lower ends of the pipes 18. Upper ends of the front legs 12 are joined pivotally to front end parts of the armrests 69. The upper ends of the rear legs 14 are joined pivotally to middle parts of the armrests 69. Lower ends of generally L-shaped brackets 19 are joined pivotally to middle parts of the rear legs 14. The lower ends of the right and the left pipes 18 of the handle 30 are joined pivotally to middle parts of the brackets 19. When the baby carriage is developed, locking members 20 slidably mounted on lower end parts of the pipes 18 of the handle 30 engage with locking parts formed in upper end parts of the brackets 19 to lock the baby carriage in an expanded state.

The right and the left front legs 12 are connected by a front connecting rod 21, and the right and the left rear legs 14 are connected by a rear connecting rod 22. A connecting rod 23 has a front end joined pivotally to a middle part of each front leg 12, and a rear end joined pivotally together with the bracket 19 to the lower end of the pipes 18 of the handle 30. Middle parts of the right and left connecting rods 23 are connected by an upper connecting rod 24.

As shown in FIG. 11, the baby carriage is locked in the developed state for use by bringing the locking members 20 mounted on the lower end parts of the pipes 18 of the handle 30 into engagement with the locking parts formed in the upper end parts of the brackets 19. When a baby carriage folding mechanism 31 supported on the handle 30 is operated to disengage the locking members 20 from the brackets 19, the armrests 69 and the connecting rods 23 can be turned upward about pivotal joining points where the armrests 69 and the connecting rods 23 are joined pivotally to the vertical sections 18 so that the front legs 12 and the rear legs 14 become substantially parallel to each other, whereby the baby carriage is folded into a package that is easy to carry.

Figure 12:
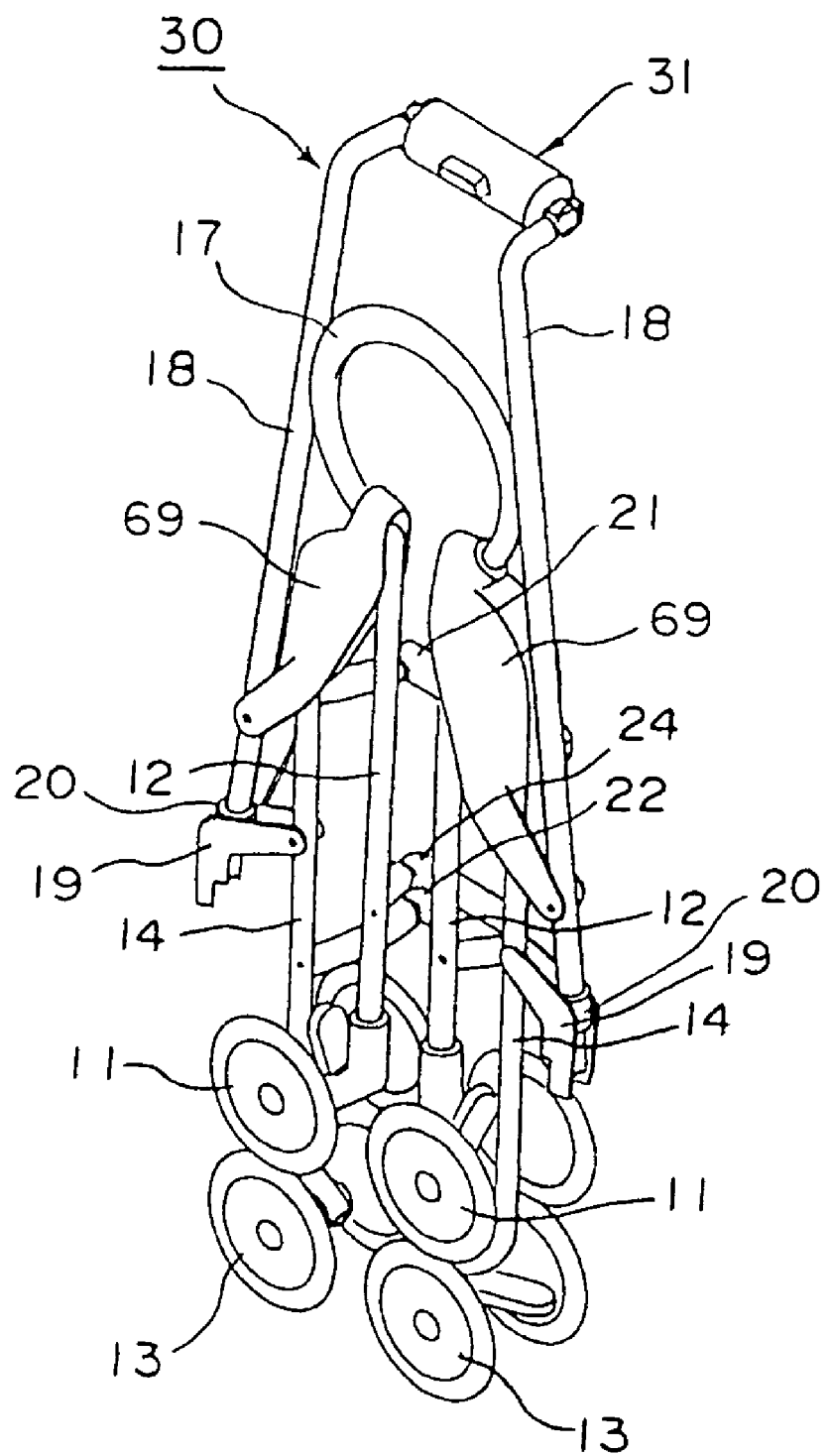
FIG. 12 is a perspective view of the baby carriage shown in FIG. 11 folded in three.

The handle 30, the front connecting rod 21, the rear connecting rod 22 and the upper connecting rod 24 are provided in their middle parts with right and left joints and are foldable. The right joints of the handle 30, the front connecting rod 21, the rear connecting rod 22 and the upper connecting rod 24 are in a right vertical plane, and the left joints of the same are in a left vertical plane. When the right and the left pipes 18 of the handle 30 are moved forward after extending the front legs 12 and the rear legs 14 parallel to each other, opposite end portions of the handle 30, the front connecting rod 21, the rear connecting rod 22 and the upper connecting rod 24 are turned forward and the baby carriage can be folded into a compact package as shown in FIG. 12; that is, the baby carriage can be folded in three.

Figure 1:
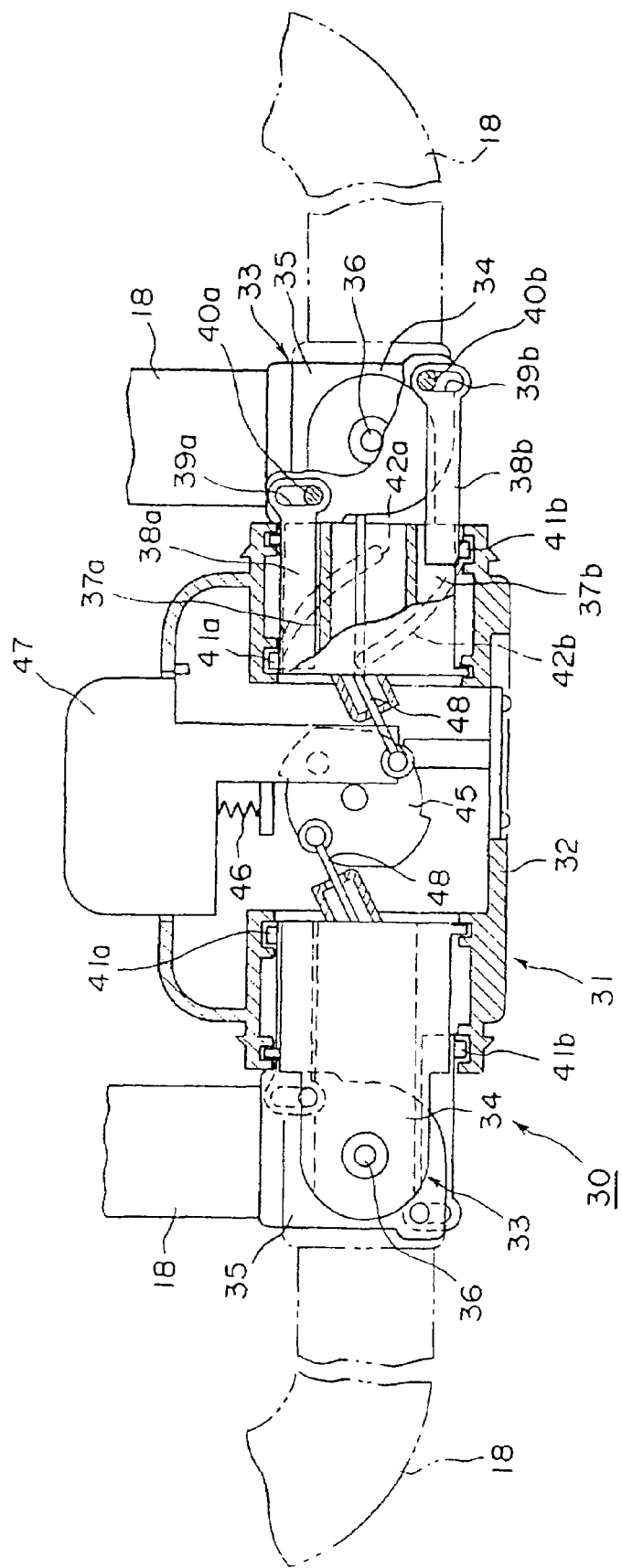
FIG. 1 is a partly cutaway sectional view of a folding mechanism operating device in a preferred embodiment according to the present invention for a baby carriage.
Figure 2:
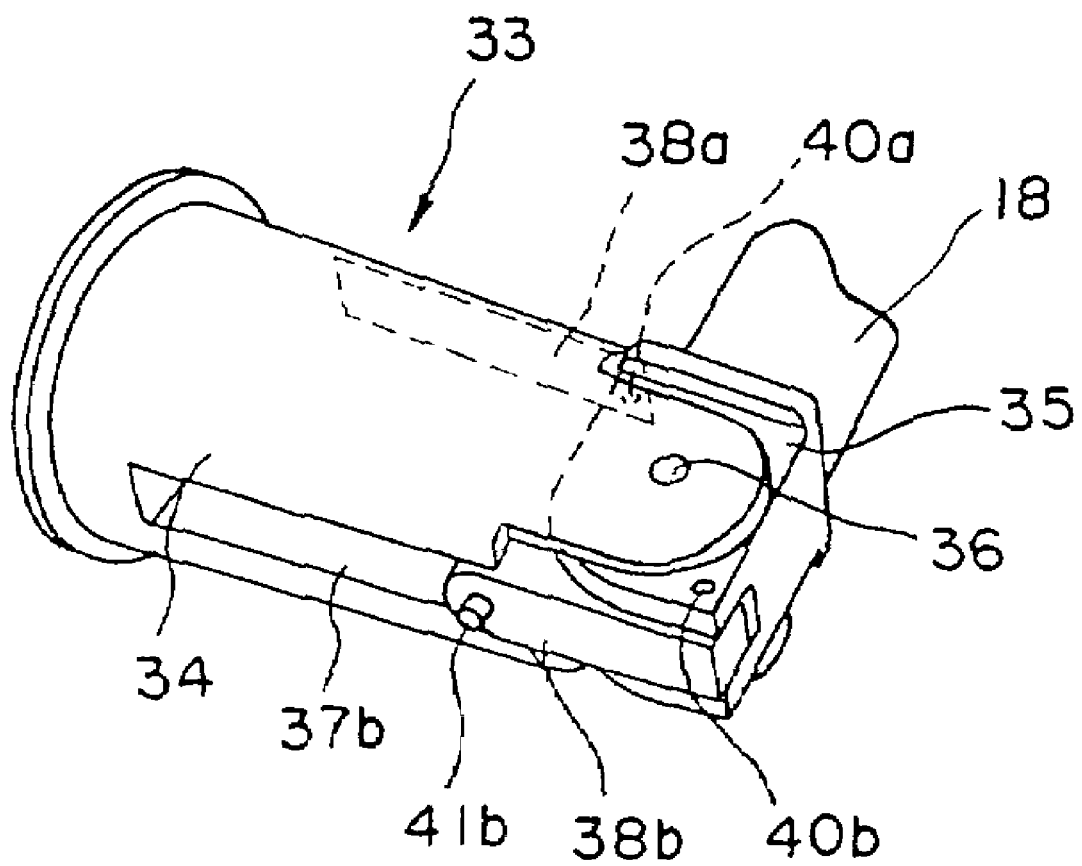
FIG. 2 is a perspective view of a joint.

The baby carriage folding mechanism 31 will be described with reference to FIG. 1. FIG. 1 shows the baby carriage folding mechanism 31 supported on a middle part of the handle 30. The pipes 18 of the handle 30 are connected by joints 33 to the opposite ends, respectively, of a casing 32 included in the baby carriage folding mechanism. FIG. 2 is a perspective view of the joint 33. Each joint 33 has a stationary member (inner member) 34 and a movable member (outer member) 35. The movable member 35 is joined pivotally to the stationary member 34 by a pin 36 for turning about the axis of the pin 36 perpendicular to the axis of the stationary member 34 (axis of the casing).

The stationary member 34 is provided with grooves 37a and 37b extending parallel to the axis of the stationary member 34 in diametrically opposite portions thereof. Actuating members 38a and 38b are placed in the grooves 37a and 37b, respectively, for sliding along the grooves 37a and 37b. The actuating members 38a and 38b are provided in their end parts with slots 39a and 39b, respectively, as shown in FIG. 1. Pins 40a and 40b disposed at eccentric positions on the movable member 35 are engaged with the slots 39a and 39b, respectively. The two pins 40a and 40b are disposed diagonally opposite to each other at positions eccentric with respect to the pin 36, and the same are engaged with the slots 39a and 39b of the actuating members 38a and 38b, respectively. The actuating members 38a and 38b are provided in their base end parts with projections 41a and 41b projecting outwardly from the actuating members 38a and 38b, respectively. One end of the pipe 18 of the handle 30 is connected to the movable member 35.

The two joints 33 thus constructed are disposed so that the axes of the stationary members 34 thereof are aligned with each other, and the respective stationary members 34 of the right and the left joints 33 are connected by the casing 32. The right and the left stationary members 34 are fitted in opposite end parts of the casing 32 so that the casing 32 is able to turn relative to the stationary members 34.

Pairs of guide grooves 42a and 42b are formed substantially symmetrically on the inner circumferences of opposite end parts of the casing 32. The guide grooves 42a and 42b are inclined relative to the axis of the casing 32 and extend through an angular range of about 90°. The projections 41a and 41b projecting from the actuating members 38a and 38b are engaged with the guide grooves 42a and 42b, respectively.

When the casing 32 is turned about its axis relative to the stationary members 34, the projections 41a and 41b are moved axially through the guide grooves 42a and 42b, so that the actuating members 38a and 38b are moved axially. The guide grooves 42a and 42b are formed such that, when the casing 32 is turned in one direction, the actuating member 38a at a position shown in FIG. 1 is moved to the right and the actuating member 38b at a position shown in FIG. 1 is moved to the left to turn the movable member 35 clockwise as viewed in FIG. 1 to turn the pipe 18 of the handle 30 from a folded position indicated by solid lines to a developed position indicated by two-dot chain lines in FIG. 1.

When the casing 32 is turned in the opposite direction, the actuating member 38a is moved to the left and the actuating member 38b is moved to the right to turn the movable member 35 together with the pipe 18 of the handle 30 from the developed position indicated by the two-dot chain lines to the folded position indicated by the solid lines in FIG. 1.

An unlocking mechanism including a pulley 45 for disengaging the locking members 20 mounted on the lower end parts of the pipes 18 of the handle 30 from the locking parts of the brackets 19 is disposed inside the casing 32. An operating knob 47 is supported on the casing 32 and is biased outward by a spring 46. The operating knob 47 is connected to the pulley 45 supported for turning in the casing 32. Ends of wires 48 are connected to the locking members 20 mounted on the lower end parts of the pipes 18 of the handle 30. When the operating knob 47 is depressed against the resilience of the spring 46, the wires 48 are pulled to disengage the locking members 20 from the locking parts of the brackets 19 so that the baby carriage can be folded.

The operation of the baby carriage folding mechanism will be described.

The operating knob 47 is depressed to disengage the locking members 20 from the brackets 19, and the front legs 12 and the rear legs 14 are gathered so as to extend parallel to each other. Subsequently, the casing 32 is turned so that the operating knob 47 moves upward. Then, the actuating members 38a and 38b are moved to the positions indicated by solid lines in FIG. 1 to turn the pipes 18 of the handle 30 from the positions indicated by two-dot chain lines to the position indicated by solid lines in FIG. 1, so that the baby carriage can be folded into the package shown in FIG. 12. When the casing 32 is turned in the opposite direction with the baby carriage in the folded state, the movable members 35 turn together with the pipes 18 of the handle 30 from the position indicated by solid lines to the position indicated by two-dot chain lines in FIG. 1. Thus, the baby carriage can be developed for use.

The baby carriage can be folded or developed only by turning the casing 32. Thus, the user is able to fold and develop the baby carriage by a series of successive operations without letting go of the casing 32 even once.

In this embodiment, the guide grooves 42a and 42b formed on the inner surface of the casing 32 are curvilinear and inclined relative to the axis of the casing 32 as shown in FIG. 3(a). The guide grooves 42a and 42b may have curvilinear circumferentially extending sections extending from starting and terminating ends of the guide grooves 42a and 42b as shown in FIG. 3(b) to provide the guide grooves 42a and 42b with a locking function to lock the baby carriage in the folded state or the developed state. The guide grooves 42a and 42b may be formed at different inclinations, respectively, as shown in FIG. 3(c) to avoid the synchronous operation of the right joint 33 and the left joint 33 so that load on the casing 32 in operating the right joint 33 and load on the casing 32 in operating the left joint 33 are applied to the casing 32 during different time ranges, respectively. The guide grooves 42a and 42b may be designed so that the inclinations of the sections of the guide grooves 42a and 42b corresponding to angular ranges of turning of the casing 32 in which load on the casing 32 increases, are reduced as shown in FIG. 3(d) to reduce torque necessary for turning the casing 32.

Figure 4A:
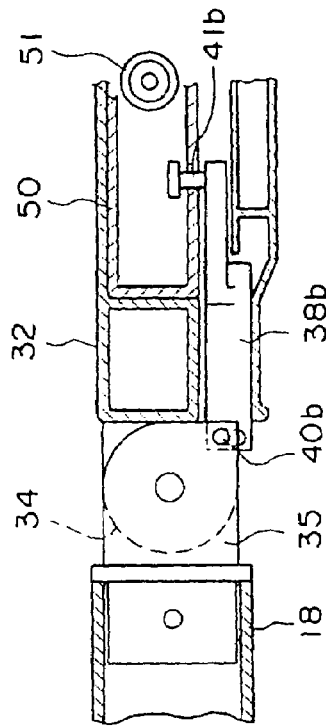
FIG. 4(a) is a sectional view of a baby carriage folding mechanism in a second embodiment according to the present invention in a state where an associated baby carriage is developed.
Figure 4B:
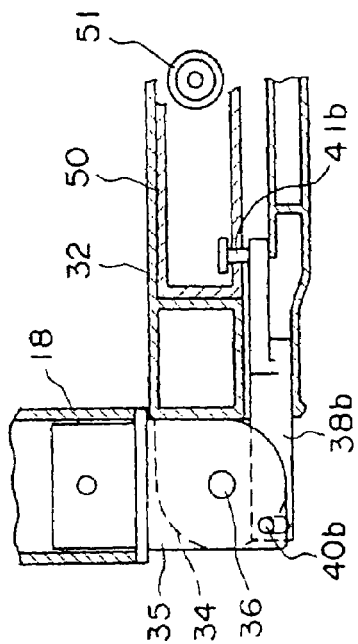
FIG. 4(b) is a sectional plan view of the baby carriage folding mechanism shown in FIG. 4(a)

FIGS. 4(a) to 4(d) show a baby carriage folding mechanism in a second embodiment according to the present invention. As shown in FIGS. 4(a) and 4(b), a casing 32 is provided with an operating member 50 capable of moving in directions perpendicular to the axis of the casing 32. The operating member 50 is biased outward by a spring 51. The operating member 50 has side walls respectively provided with symmetrical guide grooves 52 (only one of the guide grooves 52 is shown in FIGS. 4(a) to 4(d)). A projection projecting from a part of an actuating member 38b is engaged with the guide groove 52. This baby carriage folding mechanism is identical, in other respects, to the folding mechanism operating device shown in FIG. 1.

Figure 4C:
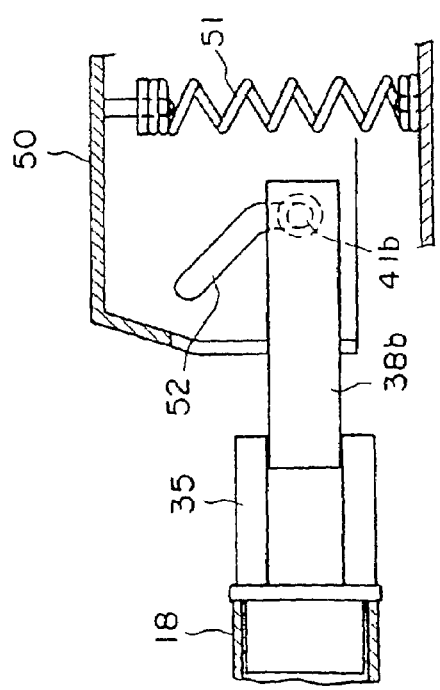
FIG. 4(c) is a sectional view of the baby carriage folding mechanism shown in FIG. 4(a) in a state where the associated baby carriage is folded.
Figure 4D:
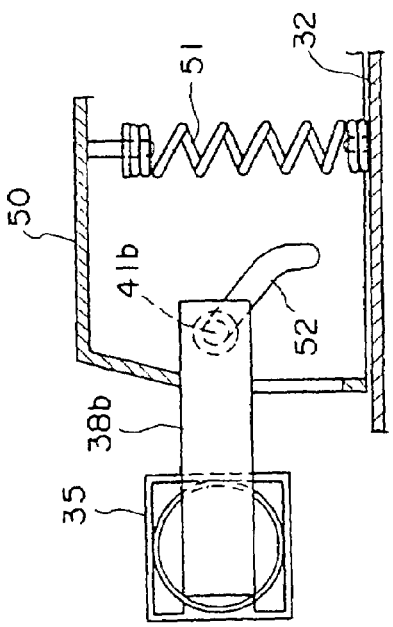
FIG. 4(d) is a sectional plan view of the baby carriage folding mechanism shown in FIG. 4(c)

When the operating member 50 at a position shown in FIG. 4(a) is depressed against the resilience of the spring 51 to a position shown in FIG. 4(c), the projection 41b engaged with the guide groove 52 is moved so that the actuating member 38b projects from the casing 32. Consequently, the movable members 35 of the right and the left joints 33 are turned, and the pipes 18 of the handle 30 are turned to their folded positions as shown in FIG. 4(d). Thus, the baby carriage can be folded.

FIGS. 5(a) and 5(b) show a baby carriage folding mechanism in a third embodiment according to the present invention including a left actuating member 38b, and a right actuating member $38b_2$. As shown in FIG. 5(a), an operating member 53 is supported on a casing, not shown, so as to be movable in directions perpendicular to the axis of the casing. The operating member is biased outward by a spring 54. The operating member 53 is provided integrally with a leg 53a. The leg 53a has a lower end part provided with a lateral slot 53b extending along a direction, i.e., a lateral direction in FIG. 5(a), perpendicular to a direction in which the operating member 53 can be depressed, i.e., a vertical direction in FIG. 5(a). A plate (pulley) 56 is supported for turning on a pin 55. A projection attached to the plate 56 is engaged with the slot 53b of the operating member 53.

The plate 56 is provided with projections 58a and 58b at symmetrical positions with respect to the axis of the pin 55. The left actuating member $38b_1$ and the right actuating member $38b_2$ have base end parts provided with slots 59a and 59b, respectively. The slots 59a and 59b extend in a direction, i.e., a vertical direction in FIG. 5(a), perpendicular to the axis of the operating members $38b_1$ and $38b_2$. The projection 58a is engaged with the slot 59a of the left actuating member $38b_1$, and the projection 58b is engaged with the slot 59b of the right actuating member $38b_2$.

When the operating member 53 in a state shown in FIG. 5(a) is depressed against the resilience of the spring 54, the plate 56 is turned clockwise, as viewed in FIG. 5(a), on the pin 55 by the projection 57. Consequently, the actuating members $38b_1$, and $38b_2$ are moved away from each other by the projections 58a and 58b as shown in FIG. 5(b), so that the movable members 35 are turned to turn the pipes 18 of the handle 30 to their folded positions, respectively.

Figure 6A:
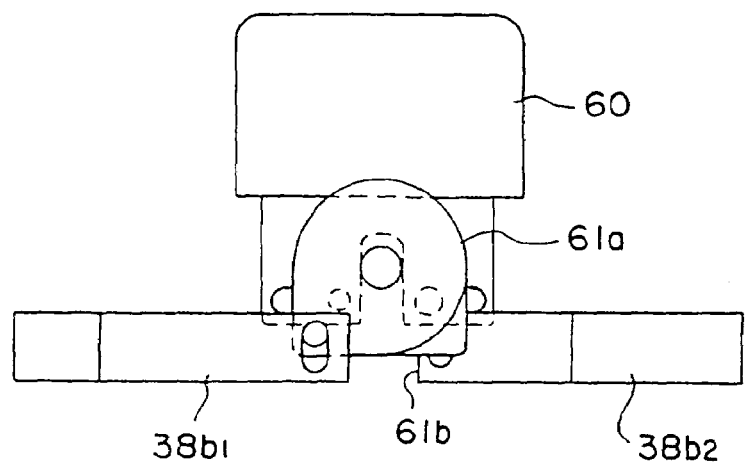
FIG. 6(a) is a plan view of a baby carriage folding mechanism in a fourth embodiment according to the present invention.
Figure 6B:
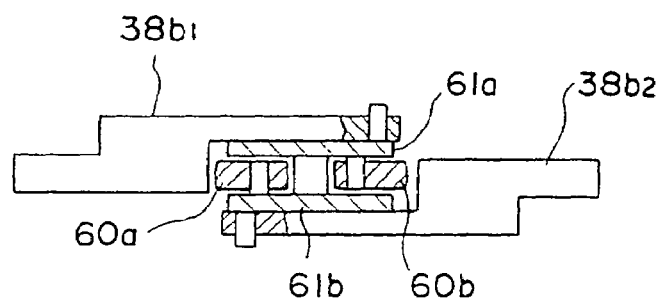
FIG. 6(b) is a longitudinal sectional view of the baby carriage folding mechanism shown in FIG. 6(a)
Figure 6C:
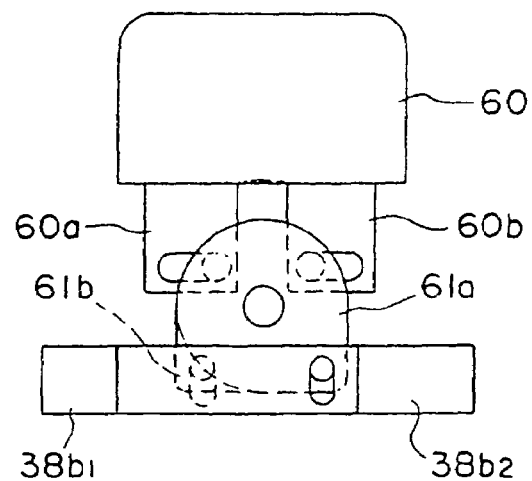
FIG. 6(c) is a view of assistance in explaining the operation of the baby carriage folding mechanism shown in FIG. 6(a)

The baby carriage folding mechanism shown in FIGS. 5(a) and 5(b) operates both the actuating members $38b_1$ and $38b_2$ by the single plate 56. A baby carriage folding mechanism in a fourth embodiment according to the present invention includes an operating member 60 provided with two legs 60a and 60b, and two plates (pulleys) 61a and 61b for driving actuating members $38b_1$ and $38b_2$ as shown in FIGS. 6(a) to 6(c). The plates 61a and 61b are turned by the legs 60a and 60b of the operating member in opposite directions, respectively.

Figure 7:
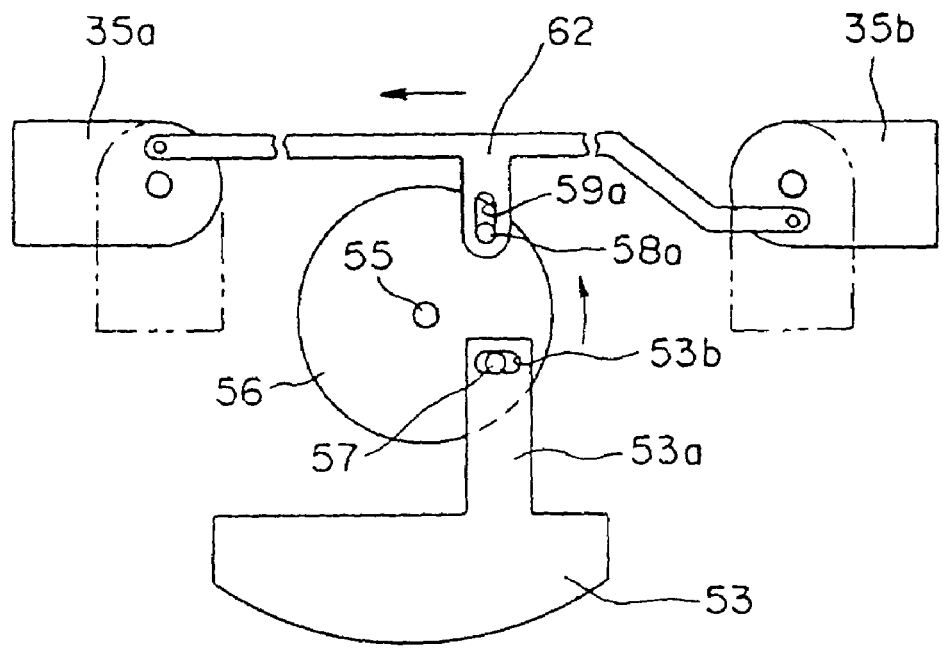
FIG. 7 is a schematic view of a baby carriage folding mechanism in a fifth embodiment according to the present invention.

FIG. 7 shows a baby carriage folding mechanism in a fifth embodiment according to the present invention. In this baby carriage folding mechanism, the opposite ends of an actuating member 62 are connected to the respective movable members 35a and 35b of the left and the right joints 33. A plate (pulley) 56 is supported for turning on a pin 55 and is provided with projections 57 and 58a. A leg projecting from a middle part of the actuating member 62 is provided with a slot extending vertically, as viewed in FIG. 7, and engaged with the pin 58a. An operating member 53 has a leg 53a provided with a slot extending horizontally, as viewed in FIG. 7 and engaged with the pin 57. When the operating member 53 is pushed up, as viewed in FIG. 7, the actuating member 62 is moved in the direction of the arrow, i.e., to the left, as viewed in FIG. 7. Consequently, the movable members 35a and 35b of the joints 33 are turned in the opposite directions, respectively, to fold the baby carriage. The operating member 53 is moved down, as viewed in FIG. 7, to develop the baby carriage.

Figure 8:
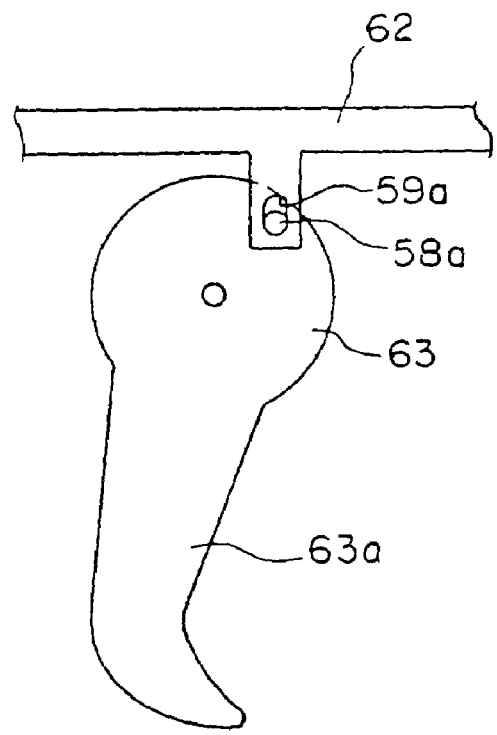
FIG. 8 is a view of a modification of the baby carriage folding mechanism shown in FIG. 7.

FIG. 8 shows a folding mechanism operating device of a modification of the baby carriage folding mechanism shown in FIG. 7. This baby carriage folding mechanism includes a plate (pulley) 63 having an operating arm 63a which is formed integrally with the plate 63. An actuating member 62 can be moved linearly in opposite directions by turning the operating arm 63a in opposite directions.

In the baby carriage folding mechanisms shown in FIGS. 5(a) to 8, the actuating member is provided with the slot, the plate is provided with the projection and the projection is engaged with the slot. The plate may be provided with a slot and the actuating lever may be provided with a projection.

Figure 9:
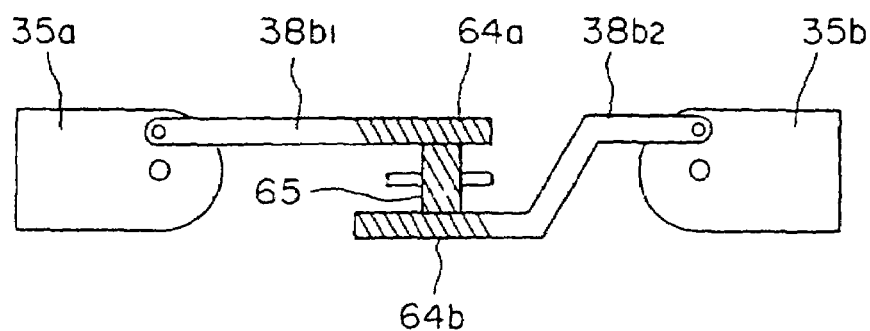
FIG. 9 is view of a baby carriage folding mechanism in a sixth embodiment according to the present invention.

FIG. 9 shows a baby carriage folding mechanism in a sixth embodiment according to the present invention. Actuating members $38b_1$ and $38b_2$ have outer ends pivotally joined to the movable members 35a and 35b of the joints 33, respectively. Threads (racks) 64a and 64b are formed in base end parts of the actuating members $38b_1$ and $38b_2$, a helical gear (pinion) 65 is interposed between the base end parts of the actuating members $38b_1$ and $38b_2$, and the threads (racks) 64a and 64b are engaged with diametrically opposite parts of the helical gear (pinion) 65. The helical gear (pinion) 65 is turned to move the actuating members $38b_1$ and $38b_2$ along the axis to fold or develop the baby carriage.

Figure 10:
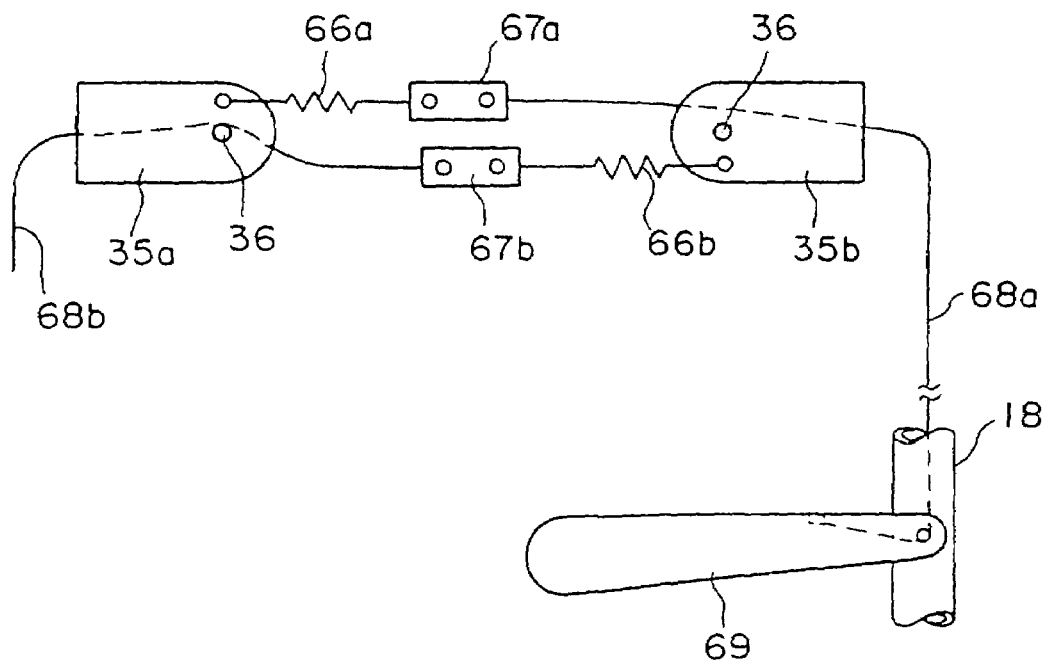
FIG. 10 is view of a baby carriage folding mechanism in a seventh embodiment according to the present invention.

FIG. 10 shows a baby carriage folding mechanism in a seventh embodiment according to the present invention. The respective movable members 35a and 35b of the left and the right joints 33 are supported on the pins 36. Sliders (actuating members) 67 and 67b included in the baby carriage folding mechanism are connected by springs to eccentric parts of the movable members 35a and 35b which are eccentric with respect to the pins 36, respectively. The sliders 67a and 67b are connected to the rear ends of the armrests 69 on the sides opposite the sides of the movable members 35a and 35b, respectively, by wires 68a and 68b extended through the vertical sections 18 of the handle 30.

When the arm rests 69 are turned upwardly to fold the baby carriage, the sliders 67a and 67b are pulled through the wires 68a and 68b, whereby the springs 66a and 66b are stressed. After the armrests 69 have been turned to their upper limit positions, the front legs 12 and the rear legs 14 have been extended substantially parallel to each other in a double-folded state. When the folding joints in the front connecting rod 21, the rear connecting rod 22 and the upper connecting rod 24 are aligned with two vertical planes, the movable members 35a and 35b of the joints 33 are turned by the resilience of the stressed springs 66a and 66b and, consequently, the baby carriage is folded in three. Thus, the baby carriage can be folded in three by operating the operating knob 47 shown in FIG. 1 to fold the baby carriage in two by turning the opposite side parts of the baby carriage forward.

In the baby carriage capable of being folded in three, each of the four members, i.e., the handle, the front connecting rod, the rear connecting rod and the upper connecting rod has the right and the left folding joint, and the folding joints have pins, respectively. An auxiliary device, such as a device employing a spring, a device employing a rubber member, a pneumatic damper or a small motor, may be combined with each of the pins of the folding joints to reduce load when operating the folding joints. Two auxiliary devices may be individually combined with the pins or a single auxiliary device may be combined with the two pins.

The baby carriage folding mechanism according to the present invention thus constructed enables the user to fold the baby carriage very easily in two first and then in three by a series of successive operations without letting go of the casing mounted on the handle even once and without folding the opposite side parts of the baby carriage by hand. Thus, the user holding a baby is able to fold the baby carriage easily.

What is claimed is:

1. A folding mechanism for folding a baby carriage, comprising:

a casing;

first and second pipes connected to opposite ends of said casing via hinged joints, respectively, said first and second pipes defining a handle for a baby carriage, wherein each of said hinged joints includes an inner member adjacent to said casing and an outer member adjacent to a respective one of said first and second pipes, with said outer member being pivotable relative to said inner member;

actuating structure for pivoting each said outer member relative to a corresponding said inner member such that the baby carriage can be folded or unfolded, wherein said actuating structure is disposed between said casing and each said outer member and comprises (i) a first actuating member slidably received within said casing, said first actuating member having a forward end part pivotally connected to said outer member of one of said hinged joints at an eccentric position of said outer member of said one of said hinged joints, and also having a base end part including one of a thread and a rack, and (ii) a second actuating member slidably received within said casing, said second actuating member having a forward end part pivotally connected to said outer member of another of said hinged joints at an eccentric position of said outer member of said another of said hinged joints, and also having a base end Dart including one of a thread and a rack; and a helical gear interposed between said base end parts of said first and second actuating members for engagement with the one of the thread and rack of said first and second actuating members.

* * * * *